(12) United States Patent
Zhang et al.

(10) Patent No.: US 9,183,497 B2
(45) Date of Patent: Nov. 10, 2015

(54) PERFORMANCE-EFFICIENT SYSTEM FOR PREDICTING USER ACTIVITIES BASED ON TIME-RELATED FEATURES

(75) Inventors: Rui Zhang, San Francisco, CA (US); Kurt E. Partridge, Palo Alto, CA (US); James M. A. Begole, Los Altos, CA (US); Robert R. Price, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 213 days.

(21) Appl. No.: 13/403,129

(22) Filed: Feb. 23, 2012

(65) Prior Publication Data

US 2013/0226856 A1    Aug. 29, 2013

(51) Int. Cl.
*G06N 5/02*        (2006.01)
*G06N 7/00*        (2006.01)
*G06Q 30/02*       (2012.01)

(52) U.S. Cl.
CPC ............... *G06N 5/02* (2013.01); *G06N 7/005* (2013.01); *G06Q 30/02* (2013.01); *G06Q 30/0255* (2013.01); *G06Q 30/0261* (2013.01)

(58) Field of Classification Search
USPC ........................................................... 706/52
See application file for complete search history.

(56) References Cited

U.S. PATENT DOCUMENTS

| 6,727,914 B1* | 4/2004 | Gutta ............................ 715/719 |
| 2009/0049030 A1* | 2/2009 | Svendsen et al. ................. 707/5 |
| 2009/0077000 A1* | 3/2009 | Begole et al. .................. 706/54 |
| 2010/0076875 A1* | 3/2010 | Ernst et al. ..................... 705/31 |
| 2010/0217730 A1* | 8/2010 | Zhao et al. ...................... 706/12 |
| 2010/0318491 A1* | 12/2010 | Anderson et al. ............... 706/52 |

OTHER PUBLICATIONS

Zheng, Vincent W., et al. "Collaborative location and activity recommendations with GPS history data." Proceedings of the 19th international conference on World wide web. ACM, 2010.*
Petrie, A., J. S. Bulman, and J. F. Osborn. "Further statistics in dentistry Part 6: Multiple linear regression." British dental journal 193.12 (2002): 675-682.*
Bellotti, Victoria, et al. "Activity-based serendipitous recommendations with the Magitti mobile leisure guide." Proceedings of the SIGCHI Conference on Human Factors in Computing Systems.*

(Continued)

*Primary Examiner* — Kakali Chaki
*Assistant Examiner* — Kevin W Figueroa
(74) *Attorney, Agent, or Firm* — Shun Yao; Park, Vaughan, Fleming & Dowler LLP

(57) ABSTRACT

A recommender system uses an activity decision tree to model the changes in a user's behavior according to a plurality of time-related features. The system determines historical activities for the user, and generates a decision tree for the user's historical activities. Each leaf node of the decision tree is associated with an activity-prediction model that computes a probability for a corresponding activity. The system selects a path of the decision tree from a root node to a leaf node of the decision tree based on a target time. The selected path traverses two or more non-leaf nodes that are each associated with a temporal decision model that compares the target time against a temporal classifier. The system then determines a probability for a user activity based on an activity-prediction model of the selected path.

21 Claims, 9 Drawing Sheets

(56) References Cited

OTHER PUBLICATIONS

Bellotti, Victoria, et al. "Activity-based serendipitous recommendations with the Magitti mobile leisure guide." Proceedings of the SIGCHI Conference on Human Factors in Computing Systems. ACM, 2008.*

Adomavicius, Gediminas, and Alexander Tuzhilin. "Context-aware recommender systems." Recommender systems handbook. Springer US, 2011. 217-253.*

* cited by examiner

PERFORMANCE-EFFICIENT SYSTEM FOR PREDICTING USER ACTIVITIES BASED ON TIME-RELATED FEATURES

RELATED APPLICATION

The subject matter of this application is related to the subject matter in a co-pending non-provisional application by Rui Zhang, Kurt E. Partridge, Robert R. Price, James M. A. Begole, and Maurice K. Chu and filed on the same day as the instant application, entitled "AUTOMATICALLY TRIGGERING PREDICTIONS IN RECOMMENDATION SYSTEMS BASED ON AN ACTIVITY-PROBABILITY THRESHOLD," having Ser. No. 13/402,751, and filing date Feb. 22, 2012.

BACKGROUND

1. Field

This disclosure is generally related to activity-based recommender systems. More specifically, this disclosure is related to using an activity decision tree to model the changes in a user's behavior according to a plurality of time-related features.

2. Related Art

Advances in mobile computing have allowed people to consume digital information at any place and any time. It is common for laptops to boast a sufficiently long battery life to allow a user to complete a near full day of work on a single charge. If the user needs an Internet connection, the user is oftentimes able to find a public Wi-Fi hot spot at a local coffee shop or a public venue such as a park. As another example, the capabilities of smartphones have increased drastically to rival the computing abilities of laptops, while also providing steady access to the Internet through a cellular network. These advances have allowed users to perform their computing tasks at a coffee shop, on a park bench, or virtually anywhere. Oftentimes, a user may take his mobile phone out from his pocket for brief moments at a time to play a quick game while riding in a bus, to read the news while waiting in line at a store, or to search for information as necessary.

However, this mobile nature of modern computing has made it difficult to provide targeted recommendations to a user. Previous recommender systems expected a user to be using a computer at home or at work, with an open mind to consider recommendations. A modern computer user is constantly on the go, and may look at his mobile device for short periods at a time. The user may accept a recommendation if it matches his current activity, and may ignore a recommendation that isn't appealing or convenient considering his current activity.

For example, a typical recommender system may analyze behavior patterns for many individual users to make a recommendation that is targeted to a certain user. The recommender system may group multiple users that have a similar behavior pattern into a group, and may recommend a product or a service to an individual user based on purchases made by other users in his group. One example of this recommender system includes the movie recommendation system used by Netflix, Inc. to recommend movies to a viewer based on the movie ratings of other similar users. Another example is the product recommendation system used by Amazon, Inc. to recommend products to the user as the user browses Amazon's online catalog. However, these recommendations may not appeal to the user if they don't reach the user at an appropriate time or date. A user may be receptive to a coupon or advertisement for a pizzeria if he is with friends on a weekend afternoon, but may ignore the coupon if he receives it a short time after eating dinner.

SUMMARY

One embodiment provides a system that uses an activity decision tree to model the changes in a user's behavior according to a plurality of time-related features. The system determines historical activities for the user, and generates a decision tree for the user's historical activities. Each leaf node of the decision tree is associated with an activity-prediction model that computes a probability for a corresponding activity. The system selects a path of the decision tree from a root node to a leaf node of the decision tree based on a target time. The selected path traverses two or more non-leaf nodes that are each associated with a temporal decision model that compares the target time against a temporal classifier. The system then determines a probability for a user activity based on an activity-prediction model of the selected path.

The system generates the decision tree by first partitioning the historical activities into activity groups, and determining contextual information for the historical activities in an activity group. The system generates a leaf node for the activity group, such that the leaf node includes an activity-prediction model that is trained using the contextual information of the activity group. The system determines one or more temporal features from contextual information associated with the activity group. The system then generates a path in the decision tree to the leaf node. A non-leaf node in the generated path includes a decision model that selects an outgoing branch toward the leaf node when a temporal feature satisfies the decision model's temporal classifier.

In some variations, the system determines a temporal feature from the contextual information by determining a timestamp for a historical activity of the activity group.

In some variations, the system determines a temporal feature from the contextual information by determining an average time duration for the historical activities in the activity group.

In some variations, the system determines a temporal feature from the contextual information by determining an activity frequency for the historical activities in the activity group.

In some variations, the system determines a temporal feature from the contextual information by determining a time range associated with the activity group.

In some embodiments, the system generates the leaf node by generating a function for the activity-prediction model. The function can have the form:

$$p=\text{logit}(a+b_1 {}^*x_1+b_2 {}^*x_2+ \ldots +b_n {}^*x_n).$$

The variable p is a probability that the contextual information corresponds to a target activity, and the variables a and $b_i$ correspond to curve-fitting parameters, and wherein $x_i$ corresponds to a context feature value.

In some embodiments, an activity group includes a plurality of historical activities associated with a common geographic location.

In some embodiments, each non-leaf node of the decision tree includes a decision model that selects a sub-path of the decision tree based on a temporal classifier.

In some embodiments, a temporal classifier includes at least one of: a season of the year; a month of the year; a week of the year; a day of the year; a day of the month; a holiday; a day of the week; a weekend; a week day; a period of the day;

a time of day; an activity time; a time range; and an elapsed amount of time since the last occurrence of a target activity.

BRIEF DESCRIPTION OF THE FIGURES

In the figures, like reference numerals refer to the same figure elements.

DETAILED DESCRIPTION

Figure 1:
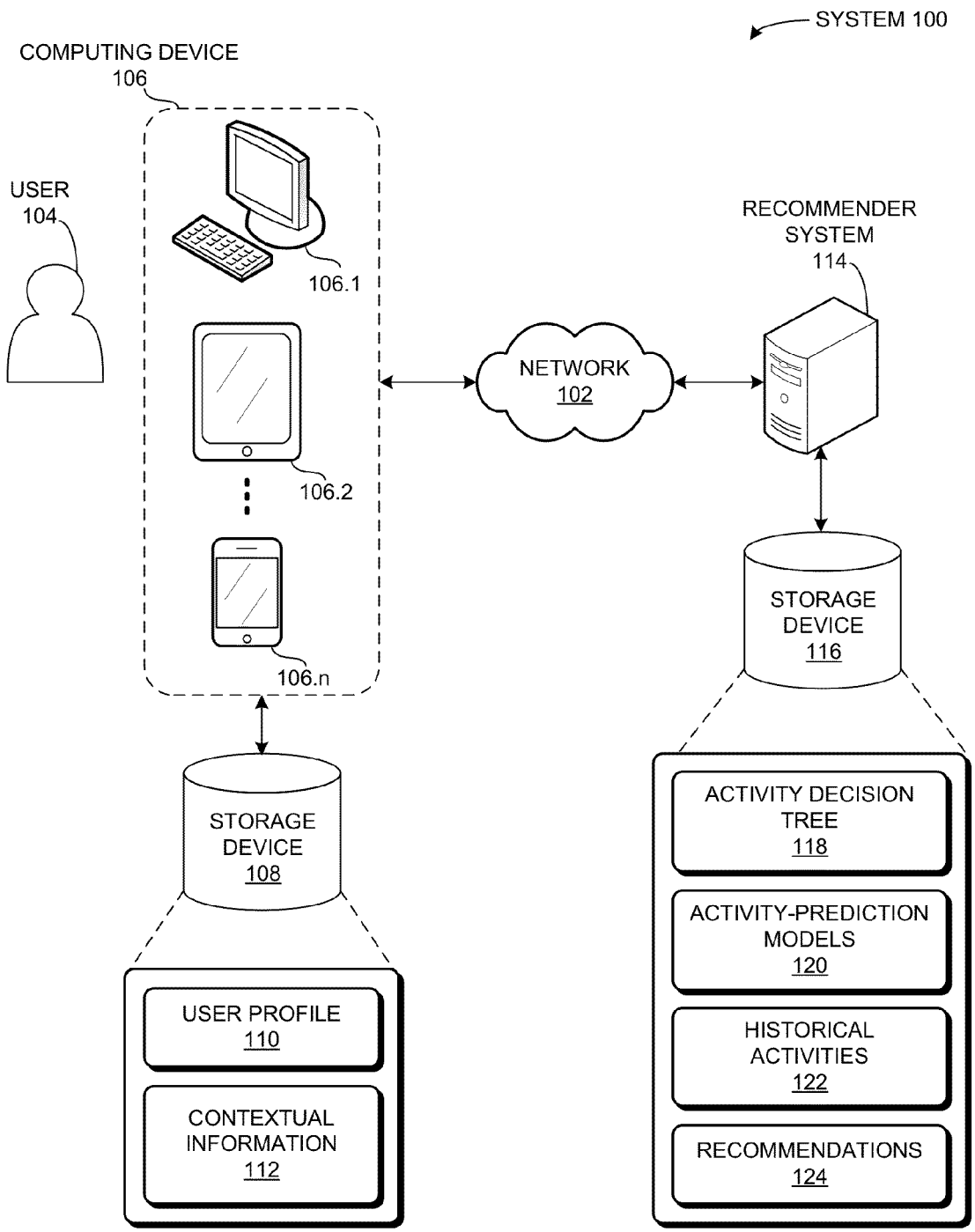
FIG. 1 illustrates an exemplary computing environment in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a recommender system that solves the problem of predicting an activity for a user whose behavior changes according to various time-related features. The system uses an activity decision tree to model the changes in the user's behavior according to a plurality of time-related features, and to determine which activities the user may be performing at a target time. The system can then make a recommendation to the user based on this determination.

The activity decision tree provides an efficient technique for modeling behavior patterns for millions of users, and for making predictions for a potentially large number of events for each user. In this context, an efficient and reasonably accurate model is preferable over a more accurate but less efficient model. Oftentimes, the less efficient models employ techniques such as complex, non-linear regression procedures, or may involve the model learning from scratch using only historical data. The activity decision tree makes use of these more-accurate techniques in a computationally efficient data structure.

During operation, the system collects and analyzes contextual information about the user from various sensor streams, and uses this contextual information to update the user's activity-prediction models that predict what the user may do next. Oftentimes, it is not clear what activity the user is about to perform until the user performs this activity. For example, if the user is driving in his car or walking in a shopping center, it is not clear where the user is traveling to until the user reaches his destination. The user's activity can be influenced by a variety of factors, including various time-related factors such as the month of the year, the time of day, or an amount of time that has passed since the user has performed a certain activity (e.g., eating a meal or drinking coffee).

To make a recommendation, the system has to consider a single activity-prediction model that is hugely complex, or a plurality of relatively simple activity-prediction models to compute a probability for each target activity. Unfortunately, generating and processing the complex activity-prediction model or the plurality of activity-prediction models consumes an undesirable amount of processing power, and many of these models may produce a low activity probability that does not result in a recommendation. In some embodiments, the system uses the activity decision tree to determine which activity-prediction models to process based on time-related features. This allows the system to process only a subset of the activity-prediction models that can result in a probability value that is meaningful to make a recommendation. Oftentimes, this divide-and-conquer approach simplifies the activity-prediction models required to capture the otherwise complex activity-prediction problem space, and the system can use time features to guide the divide-and-conquer process.

The recommender system uses the prediction about the user's activity to make a recommendation decision. The activity-based recommender system can make recommendation decisions for a variety of applications, such as to provide targeted messaging (e.g., advertisement or coupon selection), to provide a product recommendation, to optimize a transportation plan, to optimize a home energy-system, and to coordinate a social gathering for multiple people.

FIG. 1 illustrates an exemplary computing environment 100 in accordance with an embodiment. Computing environment 100 can include network 102, a computing device 106, and a recommender system 114. Computing device 106 can include any personal computing device that gathers contextual information for a user 104. For example, computing device 106 can include a personal computer 106.1, a tablet computer 106.2, a smartphone 106.n, or any other computing device such as a laptop, an internet-enabled television, etc. Computing device 106 can be coupled to a storage device 108, which can store at least a user profile 110 and contextual information 112 for user 104.

During operation, computing device 106 can monitor the behavior and activities of user 104 to generate contextual information 112. Contextual information 112 can include a geographic location, a motion trajectory, a time range, a logical name associated with a geographic location, Email/short messaging service (SMS) messages, audio recordings, shows or movies viewed by user 104, web page views, and any other information that is gathered about the behavior and activities of user 104. Computing device 106 can send contextual information 112 to recommender system 114 to receive a recommendation (e.g., an advertisement or a coupon) that is targeted to his current activity.

Recommender system 114 can include any computing device or group of computing devices coupled to network 102. Recommender system 114 can be coupled to a storage device 116, which can store at least an activity decision tree 118, activity-prediction models 120, historical activities 122 for one or more users, and product recommendations 124. A historical activity can include a snapshot of contextual information about user 104 for a period of time before the user performs a certain activity and/or while the user is performing the activity. The historical activity can also include a deterministic activity indicator that recommender system 114 can use to generate activity decision tree 118 and to train activity-prediction models 120. The deterministic activity indicator can include, for example, a geographic location and/or an activity that user 104 performs at the geographic location (e.g., jogging at Central Park), a name of a store, a name of an event, etc. Once the system generates activity decision tree 118 and trains activity-prediction models 120, the system can generate a recommendation for user 104 when it receives new contextual information from computing device 106.

Predicting a User Activity

Figure 2:
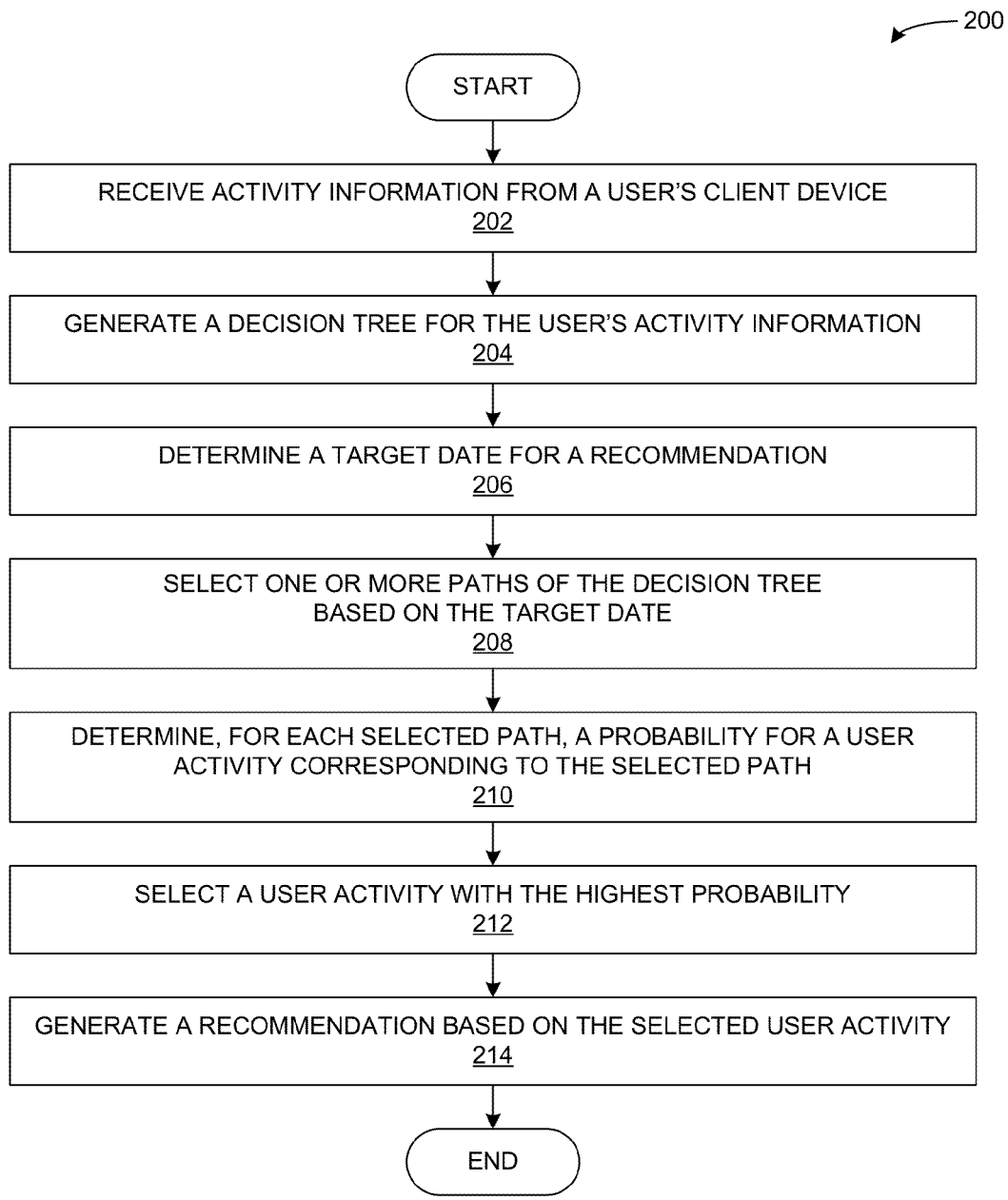
FIG. 2 presents a flow chart illustrating a method for generating a recommendation using an activity decision tree in accordance with an embodiment.

FIG. 2 presents a flow chart illustrating a method 200 for predicting a user activity using an activity decision tree in accordance with an embodiment. During operation, the system receives activity information from a user's client device (operation 202), and generates a decision tree for the user's activity information (operation 204). The activity information can include a set of historical activities, which the system uses to train a plurality of activity-prediction models. The decision tree can include a set of paths that each includes a set of temporal decision models that can be used to select a leaf node of the decision tree based on a target time. Also, each leaf node of the decision tree can include an activity-prediction model that computes a probability for a corresponding activity.

Once the system generates the decision tree from the user's historical activities, the system can use the decision tree to make a recommendation for the user based on a target time. The system begins by determining a target time for a recommendation, which is indicative of timing features such as the current time, weekday, season, and/or calendar date (operation 206), and selects one or more paths of the decision tree based on the target time (operation 208). To select a path, the system begins at a root node of the decision tree and uses a temporal decision model at each non-leaf node along a path of non-leaf nodes to process the target time and select a sub-path. A temporal decision model can use a temporal classifier to extract timing features by determining whether the target time satisfies a certain criteria. For example, a node's temporal classifier may determine whether the target time falls within the winter season. If so, the system can select a sub-path that corresponds to a summer context. Otherwise, the system can select an alternative sub-path that corresponds to all other contexts. Exemplary decision trees are discussed in further detail below with respect to FIGS. 4A and 4B.

The system determines, for each selected path, a probability for a user activity that corresponds to the selected path (operation 210). The system then selects a user activity with the highest probability as the predicted activity (operation 212), and generates a recommendation based on the selected user activity (operation 214).

Figure 3A:
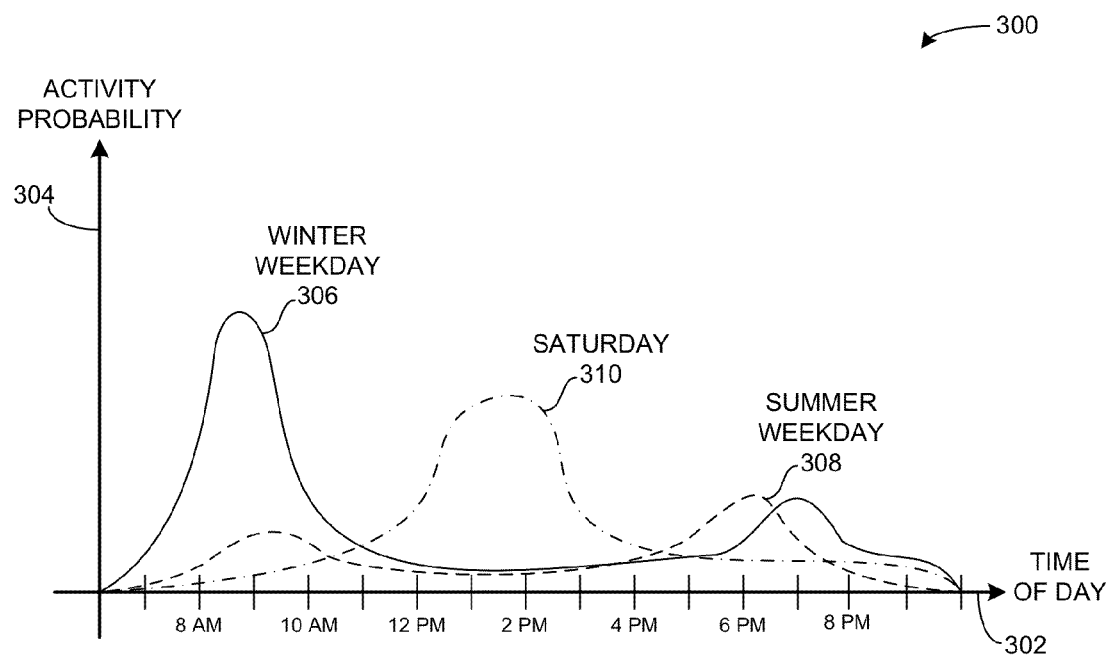
FIG. 3A presents an exemplary graph illustrating various season-dependent activity trends for a user that visits a coffee shop in accordance with an embodiment.

FIG. 3A presents an exemplary graph 300 illustrating various season-dependent activity trends for a user that visits a coffee shop in accordance with an embodiment. Graph 300 has an axis 302 for a time of day, and has an axis 304 that provides an activity probability. Graph 300 includes a probability curve 306 that provides activity probabilities for a winter weekday trend, and includes a probability curve 308 that provides activity probabilities for a summer weekday trend. During the winter weekday, the user may need coffee in the morning to give his day a boost, and may have a high probability of visiting the coffee shop before going to work. Also, the user may visit the coffee shop after work on occasion to either do some additional work out of the office, or to meet with friends. These trends are depicted in probability curve 306 by the large peak at around 9 AM and the smaller peak at around 7 PM.

However, the user may change his routine during the summer weekdays. The user may not visit the coffee shop as often during the summer mornings, possibly because he may find it easier to wake up early enough to make coffee at home before driving to work, or may drink coffee at the office later in the day. If the user does decide to buy a drink on his way to work, the user may be more likely to visit a smoothie shop than to visit a coffee shop. The user may still decide to visit the coffee shop after work on occasion to do some additional work out of the office or to meet with friends. These trends are depicted in probability curve 308 by the small peak at around 9 AM and the larger peak at around 6 PM.

Graph 300 also includes a probability curve 310 that provides activity probabilities for the user during Saturdays. The user may have the habit of sleeping in on Saturday mornings all year round, but may decide to visit the coffee shop after he starts his day to read a book or to socialize with friends. This trend is depicted by the afternoon peak in probability curve 310.

Figure 3B:
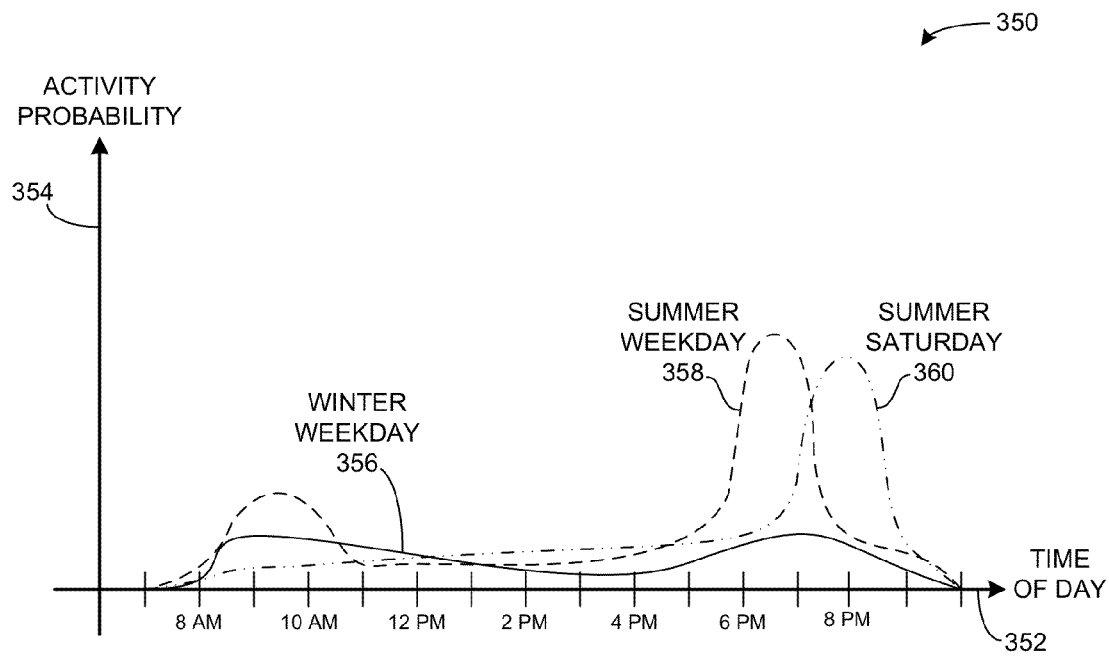
FIG. 3B presents an exemplary graph illustrating various season-dependent activity trends for a user that visits a smoothie shop in accordance with an embodiment.

FIG. 3B presents an exemplary graph 350 illustrating various season-dependent activity trends for a user that visits a smoothie shop in accordance with an embodiment. Graph 350 has an axis 352 for a time of day, and has an axis 354 that provides an activity probability. Graph 350 includes a probability curve 356 that provides activity probabilities for a winter weekday trend, and includes a probability curve 358 that provides activity probabilities for a summer weekday trend. During the winter weekday, the user may not be interested in drinking a smoothie during a cold morning, but may visit the smoothie shop once in a while after work for a healthy snack. This trend is depicted in probability curve 356 by the small peak at around 9 AM and the small peak at around 7 PM.

However, the user may change his routine during the summer weekdays to consume more smoothies. The user may not visit the coffee shop as often during the summer mornings, but instead may have a tendency to visit the smoothie shop on his way to work for a healthy breakfast. The user may also visit the smoothie shop after a workout during some weekday evenings. These trends are depicted in probability curve 358 by the small peak at around 9 AM and the larger peak at around 6:30 PM.

Graph 350 also includes a probability curve 360 that provides activity probabilities for a trend for Saturdays over the summer. The user may have the habit of exercising on Saturday evenings during the summer, and may decide to visit the smoothie shop for a healthy snack at the end of his day. This trend is depicted in probability curve 360 by the large peak at around 8 PM.

Figure 4:
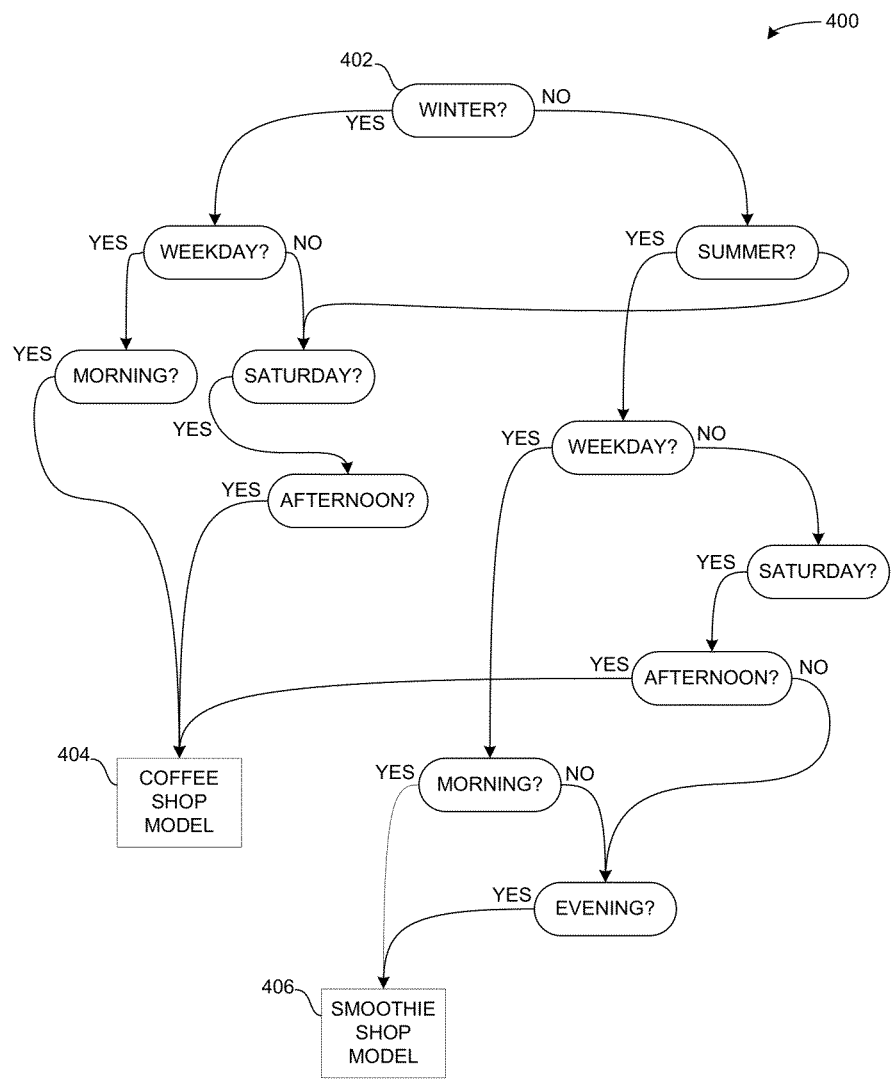
FIG. 4 illustrates an exemplary activity decision tree in accordance with an embodiment.

FIG. 4 illustrates an exemplary activity decision tree 400 in accordance with an embodiment. The recommender system can extract temporal features from the historical activities represented by graphs 300 and 350 of FIG. 3, and uses these temporal features to generate activity decision tree 400 for the user. The system can use activity decision tree 400 to determine which activity-prediction models are worth processing at a certain point in time.

Activity decision tree 400 can include a root node 402, a temporal decision model at each non-leaf node (illustrated by an oval shape), and an activity-prediction model at each leaf node (illustrated by a square shape). Specifically, the system can use activity decision tree 400 to determine that it can use a coffee shop model 404 to process the user's contextual information during winter weekday mornings and during Saturday afternoons. Also, the system can use activity decision tree 400 to determine that it can use a smoothie shop model 406 to process the user's contextual information during weekday mornings or Saturday evenings over the summer.

Determining when the system can process coffee shop model 404 or smoothie shop 406 allows the system to avoid performing computationally expensive operations. For example, if the system were to process model 404 and/or model 406 hourly to predict whether the user is about to visit a coffee shop or a smoothie shop, the system would need to request contextual information from the user's client device each hour. This request operation would consume an undesirably large amount of network bandwidth, and processing the contextual information using multiple models would not be computationally efficient. Also, if the user's client device is a battery-operated mobile device, these hourly requests for contextual information would cause the user's client device to consume an unreasonable amount of power.

Generating and Maintaining the Decision Tree

The system can generate a new activity decision tree from the user's historical activities by iteratively adding leaf nodes for various activity-decision models to the new decision tree. Each path to a leaf node corresponds to one or more time-related features that cause the system to analyze a corresponding activity-decision model. The system can also maintain the decision tree over time by adding new leaf nodes for different activity-decision models, and/or adding new paths to existing leaf nodes.

Figure 5:
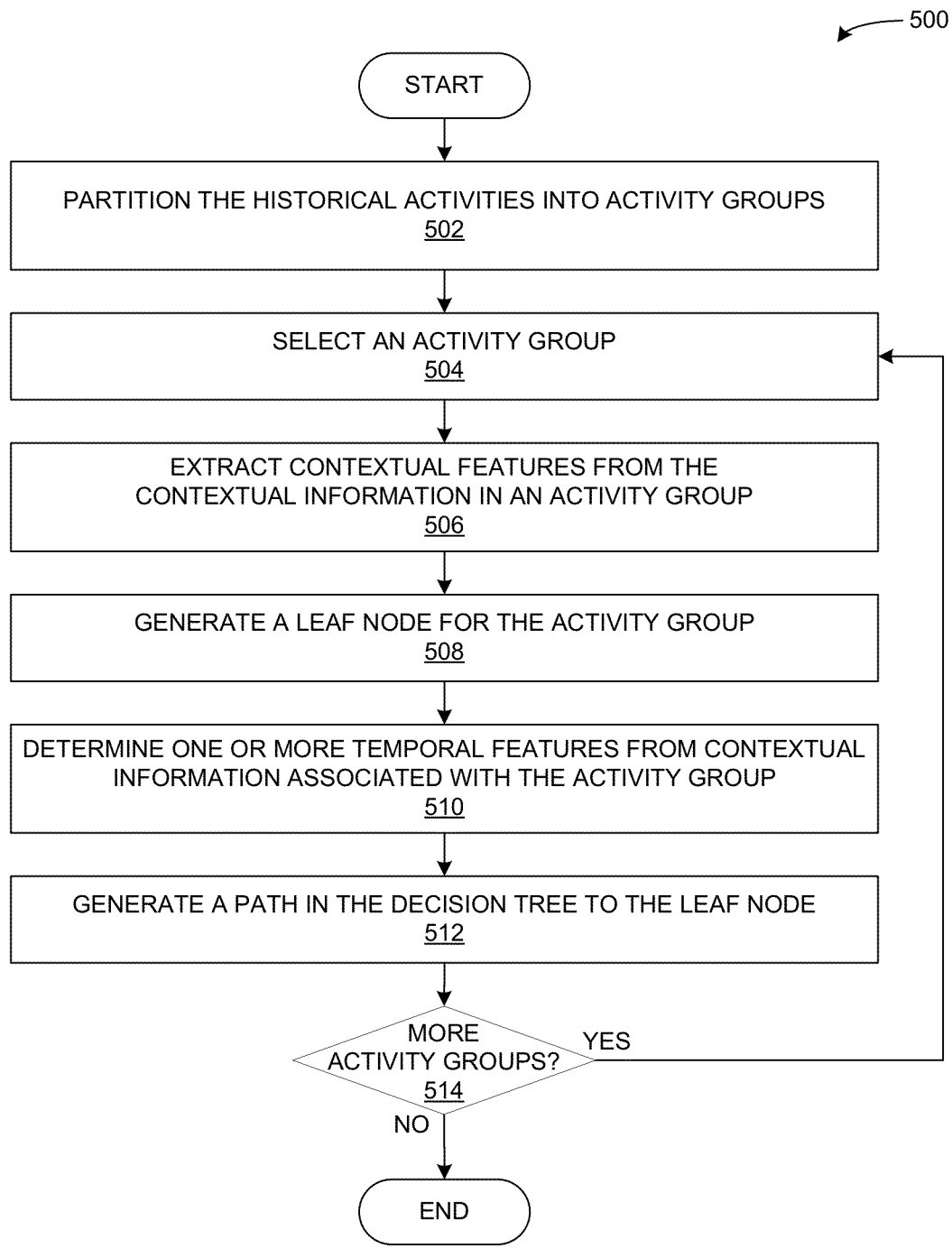
FIG. 5 presents a flow chart illustrating a method for adding a leaf node to an activity decision tree in accordance with an embodiment.

FIG. 5 presents a flow chart illustrating a method 500 for adding leaf nodes to a new or an existing activity decision tree in accordance with an embodiment. During operation, the system partitions the historical activities into one or more activity groups (operation 502), and generates a leaf node for the decision tree for each activity group. For example, the system can create an activity group that includes historical activities that share a common deterministic activity indicator. The deterministic activity indicator can include a geographic location and/or an activity that the user performs at the geographic location (e.g., jogging at Central Park), a name or category of a store that the user has visited, etc.

The system then selects an activity group (operation 504), and extracts contextual features from the contextual information in the activity group (operation 506). The system generates a leaf node for the activity group, such that the leaf node is associated with an activity-prediction model that analyzes the user's contextual information to generate a probability that the user is performing a certain activity (operation 508). While generating the leaf node, the system generates a function for the activity-prediction model using the extracted contextual features as training data. The function can have the form:

$$p=\text{logit}(a+b_1 * x_1+b_2 * x_2+\ldots+b_n * x_n) \quad (1)$$

In equation (1), the variable p is a probability that the contextual information corresponds to a target activity, and the variables a and $b_i$ correspond to curve-fitting parameters. The variable a is known as the intercept, and the variables $b_i$ are known as the regression coefficients. The system can determine the values for coefficients a and $b_i$ by processing the contextual features, for example, using the method of least squares, maximum-likelihood estimation, or any other statistical analysis technique now known or later developed. Further, in equation (1), the variables $x_i$ correspond to real-time context feature values from the user that are used to generate the probability p.

To add the new leaf node to the decision tree, the system determines one or more temporal features from contextual information associated with the activity group (operation 510). Exemplary temporal features are illustrated in FIG. 4 as oval shapes. The temporal features can include at least one of: a season of the year; a month of the year; a week of the year; a day of the year; a day of the month; a holiday; a day of the week; a weekend; a week day; a period of the day; a time of day; an activity time; a time range; and an elapsed amount of time since the last occurrence of a target activity. The system then generates a path in the decision tree to the leaf node, such that the path includes a temporal decision model for each of the temporal features (operation 512).

The system adds the path by traversing the decision tree from the root node to select a path from the activity group's temporal features, and pruning down the set of temporal features that are covered by the traversed nodes. Then, when the system reaches a leaf node, the system can determine whether any of the temporal features that are not covered by the selected path. If so, the system can append, to the selected path, a new sub-path that accounts for the remaining temporal features.

In some instances, adding a sub-path to an existing decision tree can cause the decision tree to become unbalanced over time, which can cause subsequent search or node-insertion operations on the decision tree to become inefficient. In some embodiments, the system can balance the decision tree after adding each new leaf node, after adding a determinable number of new leaf nodes, or when a sub-graph of the decision tree becomes unbalanced. For example, the system can balance the decision tree by merging one or more adjacent non-leaf nodes with a leaf node that has a temporal decision model that is equivalent to the models of the non-leaf nodes that are being replaced. As another example, the system can balance the decision tree by rotating a sub-tree around the root node of the sub-tree.

The system then determines whether there are more activity groups for which it needs to generate a leaf node (operation 514). If so, the system returns to operation 504 to add another leaf node for the decision tree.

Figure 6:
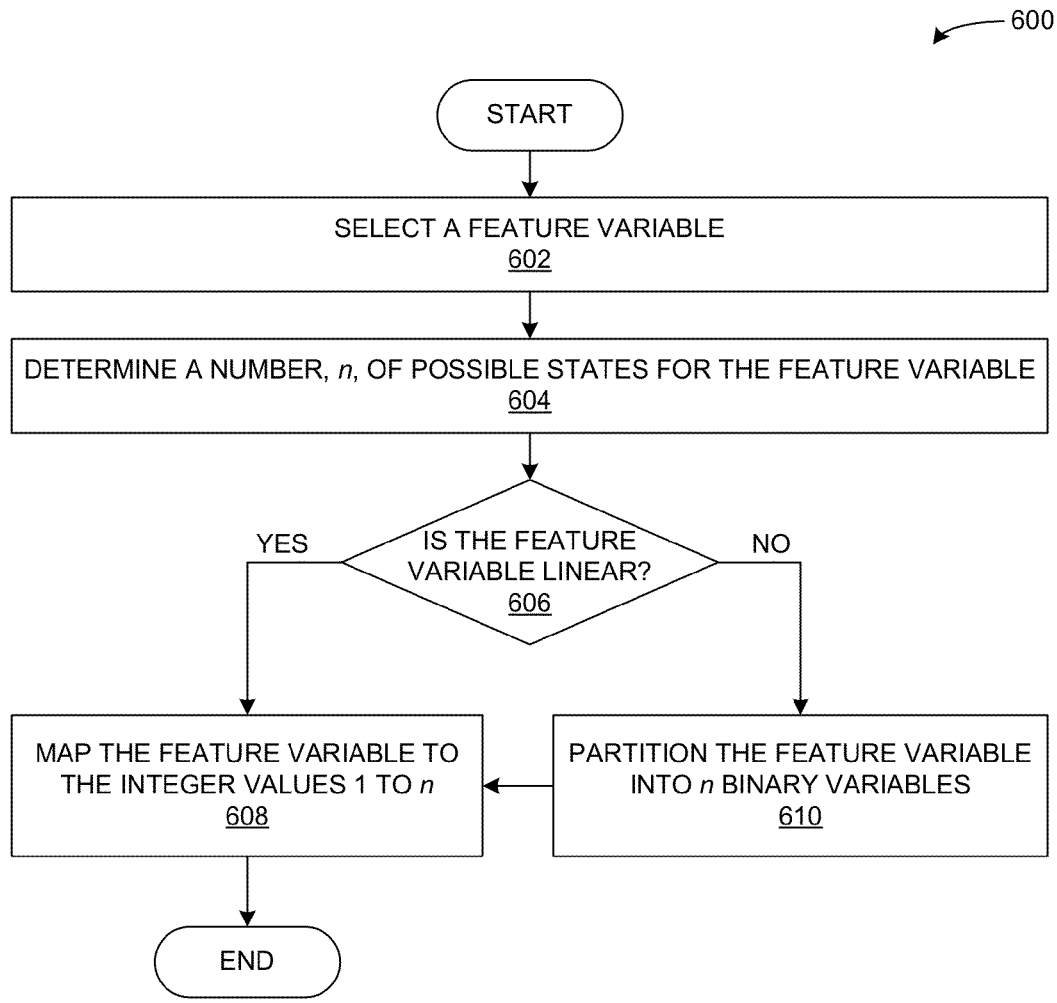
FIG. 6 presents a flow chart illustrating a method for determining temporal features from contextual information in accordance with an embodiment.

FIG. 6 presents a flow chart illustrating a method 600 for determining temporal features from contextual information in accordance with an embodiment. During operation, the system can select a feature variable (operation 602), and determines a number, n, of possible states for the feature variable (operation 604). The set of possible states for the feature variable may be linear or non-linear. For example, a feature variable for a breakfast time can include a set of states for a linear range of hours in a day during which the user typically eats breakfast. The breakfast feature variable can include three states with the linear range [8,10]. On the other hand, a feature variable for a mealtime can include a set of states for a non-linear range of hours in the day that corresponding to breakfast, lunch, and dinner. The mealtime feature variable can include eight states for the non-linear mealtime hours in the set ([8,10], [12,13], [18,20]).

The system then determines if the feature variable is linear (operation 606). If so, the system maps the feature variable to the set of possible states (e.g., a range in hours, days, months, etc.) (operation 608). However, if the feature variable is non-linear, the system partitions the feature variable into two or more binary variables (610). In the example for the mealtime hours, the system can partition the mealtime feature variable into three other binary variables: a breakfast feature variable, a lunch feature variable, and a dinner feature variable. After partitioning the feature variable, the system can proceed to operation 608 to map each of the partitioned feature variables to its corresponding range of states.

Generating a Recommendation

Figure 7:
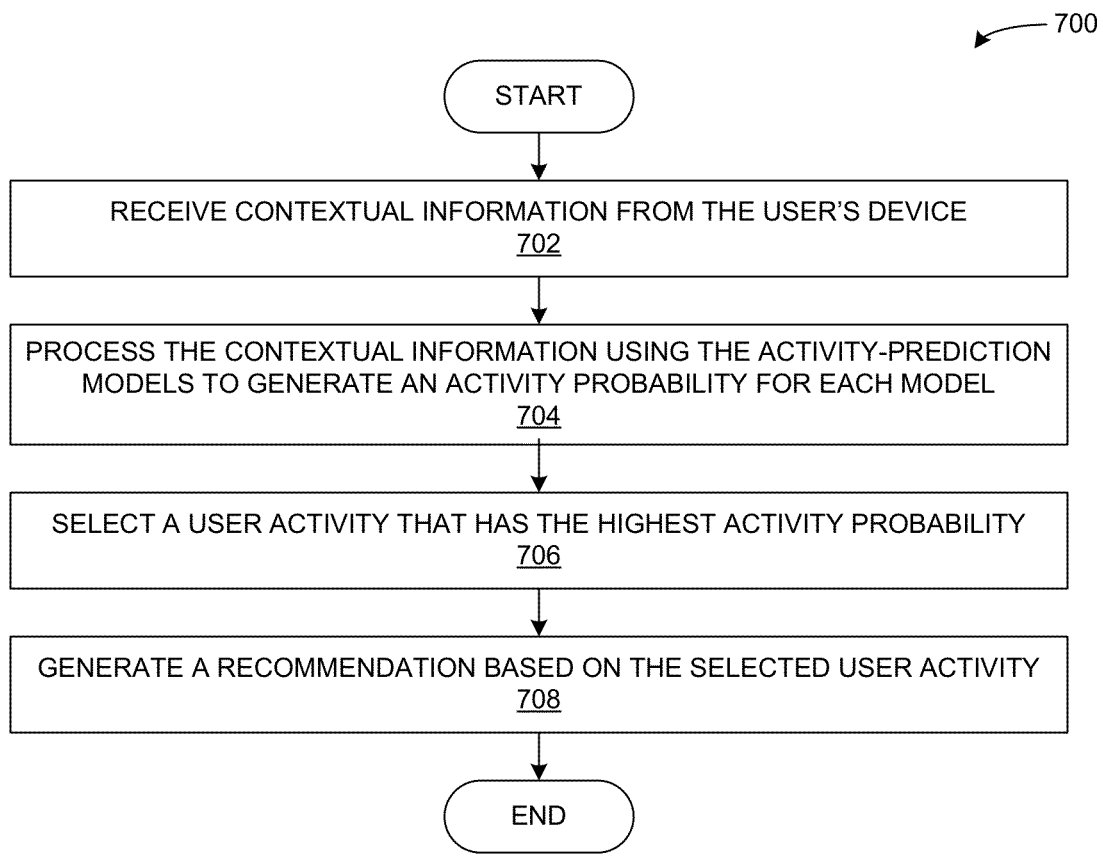
FIG. 7 presents a flow chart illustrating a method for generating a recommendation for a user in accordance with an embodiment.

FIG. 7 presents a flow chart illustrating a method 700 for generating a recommendation for a user in accordance with an embodiment. During operation, the system can receive contextual information from the user's device (operation 702). The system processes the contextual information using one or more activity-prediction models to generate an activity probability for each model (operation 704).

To generate a recommendation, the system can select a user activity that has a highest activity probability (operation 706), and generates a recommendation for the user based on the selected user activity (operation 708). The recommendation can include an advertisement or coupon that is targeted to the user's current activity. For example, if the user is driving to or walking in a shopping center, the system can make a prediction as to which grocery or retail store the user is about to enter. The system can then use this activity prediction to select an advertisement or coupon for a certain merchandise item at this store, and presents this advertisement or coupon to the user.

Figure 8:
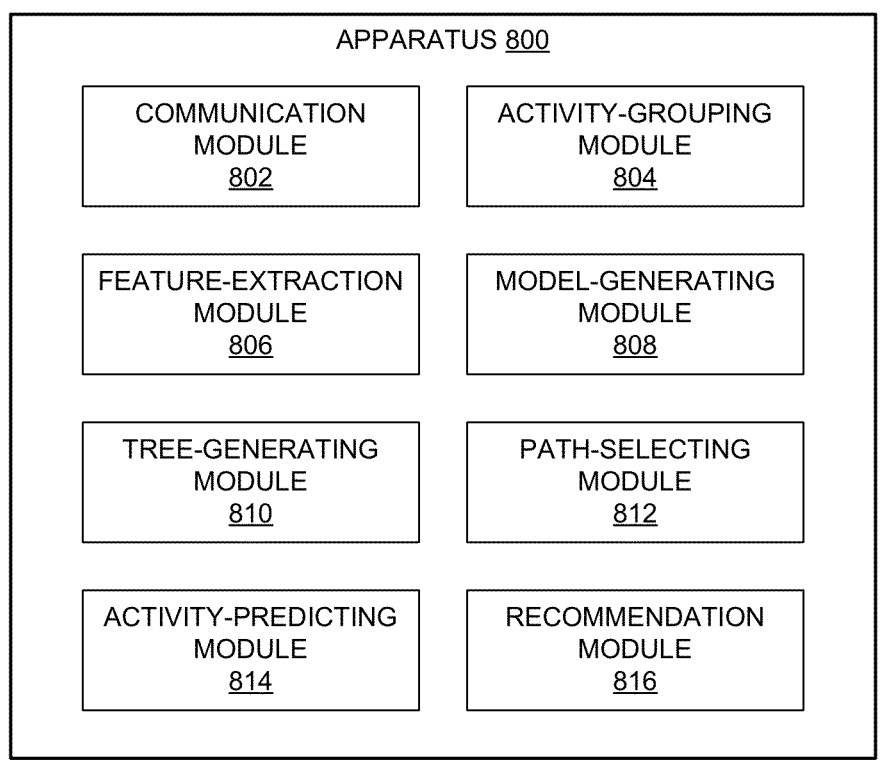
FIG. 8 illustrates an exemplary apparatus that facilitates using an activity decision tree to determine a probability for a user activity in accordance with an embodiment.

FIG. 8 illustrates an exemplary apparatus 800 that facilitates using a decision tree to determine a probability for a user activity in accordance with an embodiment. Apparatus 800 can comprise a plurality of modules which may communicate with one another via a wired or wireless communication channel. Apparatus 800 may be realized using one or more integrated circuits, and may include fewer or more modules than those shown in FIG. 8. Further, apparatus 800 may be integrated in a computer system, or realized as a separate device which is capable of communicating with other computer systems and/or devices. Specifically, apparatus 800 can comprise a communication module 802, an activity-grouping module 804, a feature-extraction module 806, a model-generating module 808, a tree-generating module 810, a path-selecting module 812, an activity-predicting module 814, and a recommendation module 816.

In some embodiments, communication module 802 can receive historical activities from one or more users. Activity-grouping module 804 can partition the historical activities into activity groups, and feature-extraction module 806 can determine one or more temporal features from contextual information associated with the activity group. Model-generating module 808 can determine contextual information for the historical activities in an activity group, and generate a leaf node for the activity group. The leaf node includes an activity-prediction model that is trained using the contextual information of the activity group. Tree-generating module 810 can generate a path in the decision tree to the leaf node.

Path-selecting module 812 can select a path from a root node to a leaf node of the decision tree based on a target time, and activity-predicting module 814 can determine a probability for a user activity based on an activity-prediction model of the selected path. Recommendation module 816 can make a recommendation for the user based on the predicted user activity.

Figure 9:
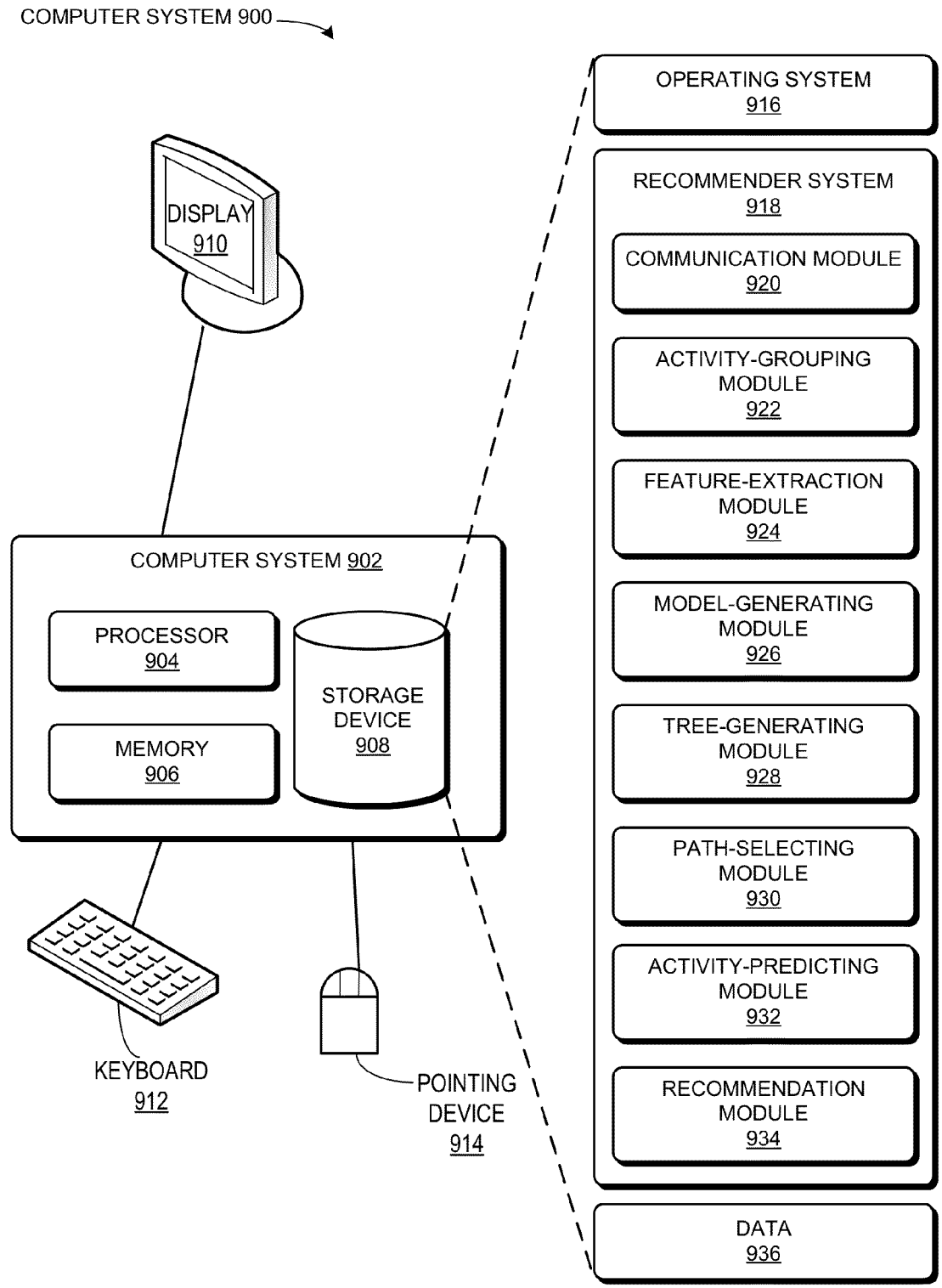
FIG. 9 illustrates an exemplary computer system that facilitates using an activity decision tree to determine a probability for a user activity in accordance with an embodiment.

FIG. 9 illustrates an exemplary computer system 902 that facilitates using a decision tree to determine a probability for a user activity in accordance with an embodiment. Computer system 902 includes a processor 904, a memory 906, and a storage device 908. Memory 906 can include a volatile memory (e.g., RAM) that serves as a managed memory, and can be used to store one or more memory pools. Furthermore, computer system 902 can be coupled to a display device 910, a keyboard 912, and a pointing device 914. Storage device 908 can store operating system 916, recommender system 918, and data 936.

Recommender system 918 can include instructions, which when executed by computer system 902, can cause computer system 902 to perform methods and/or processes described in this disclosure. Specifically, recommender system 918 may include instructions for receiving historical activities from one or more users (communication module 920), and for partitioning the historical activities into activity groups (activity-grouping module 922). Recommender system 918 can include instructions for determining one or more temporal features from contextual information associated with the activity group (feature-extraction module 924). Recommender system 918 can also include instructions for determining contextual information for the historical activities in an activity group, and generating a leaf node for the activity group (model-generating module 926). Recommender system 918 can also include instructions for generating a path in the decision tree to the leaf node (tree-generating module 928).

Recommender system 918 can also include instructions for selecting a path from a root node to a leaf node of the decision tree based on a target time (path-selecting module 930), and for determining a probability for a user activity based on an activity-prediction model of the selected path (activity-predicting module 932). Recommender system 918 can also include instructions for making a recommendation for the user based on the predicted user activity (recommendation module 934).

Data 936 can include any data that is required as input or that is generated as output by the methods and/or processes described in this disclosure. Specifically, data 936 can store at least a user profile, historical or recent contextual information for a user, activity-prediction models for the user, temporal classifiers, activity decision trees, and activity-based recommendations.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   determining, by a computing device, one or more activity groups based on historical activities for a user;
   extracting contextual features from contextual information associated with an activity group;
   calculating, for each of a plurality of time instances, an activity probability that the user is performing an activity associated with the activity group based on an analysis of the contextual features;
   identifying one or more temporal features of the activity group, based on the activity probability values for the plurality of time instances, which comprises:
      selecting an activity feature variable;
      determining a set of possible temporal features for the activity feature variable based on the activity probability values; and
      in response to determining that the activity feature variable includes a non-linear set of possible temporal features:
         partitioning the activity feature variable into two or more binary variables; and
         mapping each of the two or more binary variables to one or more corresponding possible temporal features; and
   generating a decision tree, wherein a path of the decision tree includes a temporal decision model for each of the temporal features, wherein a temporal decision model compares a target time against a temporal classifier, and wherein a leaf node of the decision tree includes an activity-prediction model based on the activity probability.

2. The method of claim 1, wherein identifying the one or more temporal features further comprises:
   in response to determining that the activity feature variable includes a linear set of possible temporal features, mapping the activity feature variable to the set of possible temporal features.

3. The method of claim 1, wherein identifying the one or more temporal features includes at least one of:
   determining a timestamp for a historical activity of the activity group;
   determining an average time duration for the historical activities in the activity group;
   determining an activity frequency for the historical activities in the activity group; and
   determining a time range associated with the activity group.

4. The method of claim 1, wherein an activity group includes a plurality of historical activities associated with a common geographic location.

5. The method of claim 1, wherein generating the decision tree further comprises:
   generating a leaf node for the activity group, wherein the leaf node includes an activity-prediction model that is trained based on the contextual features;
   in response to identifying the temporal features, adding a path to a leaf node in the decision tree based on the temporal features, wherein the added path includes a temporal decision model for each of the temporal features;
   in response to determining that a temporal feature of the activity group is not covered by the added path, appending to the added path a sub-path that includes a temporal decision model for the temporal feature not covered by the added path; and
   wherein the method further comprises selecting a path of the decision tree from a root node to a leaf node of the decision tree based on the target time, wherein the selected path traverses two or more non-leaf nodes that are each associated with a temporal decision model that compares the target time against a temporal classifier.

6. The method of claim 5, wherein generating the leaf node involves generating a function for the activity-prediction model, wherein the function has the form:

$$p=\text{logit}(a+b_1 * x_1+b_2 * x_2+ \ldots +b_n * x_n);$$

wherein p is a probability that the contextual information corresponds to a target activity, wherein a and $b_i$ correspond to curve-fitting parameters, and wherein $x_i$ corresponds to a context feature value.

7. The method of claim 5, wherein a temporal decision model associated with a non-leaf node selects an outgoing branch toward a leaf node when a temporal feature satisfies a temporal classifier of the decision model, and wherein the temporal classifier includes at least one of:
   a season of the year;
   a month of the year;
   a week of the year;
   a day of the year;
   a day of the month;
   a holiday;
   a day of the week;
   a weekend;
   a week day;
   a period of the day;
   a time of day;
   an activity time;
   a time range; and
   an elapsed amount of time since the last occurrence of a target activity.

8. A non-transitory computer-readable storage medium storing instructions that when executed by a computer cause the computer to perform a method, the method comprising:
   determining, by a computing device, one or more activity groups based on historical activities for a user;
   extracting contextual features from contextual information associated with an activity group;
   calculating, for each of a plurality of time instances, an activity probability that the user is performing an activity associated with the activity group based on an analysis of the contextual features;
   identifying one or more temporal features of the activity group, based on the activity probability values for the plurality of time instances, which comprises:
      selecting an activity feature variable;
      determining a set of possible temporal features for activity feature variable based on the activity probability values; and
      in response to determining that the activity feature variable includes a non-linear set of possible temporal features:
         partitioning the activity feature variable into two or more binary variables; and
         mapping each of the two or more binary variables to one or more corresponding possible temporal features; and generating a decision tree, wherein a path of the decision tree includes a temporal decision model for each of the temporal features, wherein a temporal decision model compares a target time against a temporal classifier, and wherein a leaf node of the decision tree includes an activity-prediction model based on the activity probability.

9. The storage medium of claim 8, wherein identifying the one or more temporal features further comprises:
in response to determining that the activity feature variable includes a linear set of possible temporal features, mapping the activity feature variable to the set of possible temporal feature.

10. The storage medium of claim 8, wherein identifying the one or more temporal features includes at least one of:
determining a timestamp for a historical activity of the activity group;
determining an average time duration for the historical activities in the activity group;
determining an activity frequency for the historical activities in the activity group; and
determining a time range associated with the activity group.

11. The storage medium of claim 8, wherein an activity group includes a plurality of historical activities associated with a common geographic location.

12. The storage medium of claim 8, wherein generating the decision tree further comprises:
generating a leaf node for the activity group, wherein the leaf node includes an activity-prediction model that is trained based on the contextual features;
in response to identifying the temporal features, adding a path to a leaf node in the decision tree based on the temporal features, wherein the added path includes a temporal decision model for each of the temporal features;
in response to determining that a temporal feature of the activity group is not covered by the added path, appending to the added path a sub-path that includes a temporal decision model for the temporal feature not covered by the added path; and
wherein the method further comprises selecting a path of the decision tree from a root node to a leaf node of the decision tree based on the target time, wherein the selected path traverses two or more non-leaf nodes that are each associated with a temporal decision model that compares the target time against a temporal classifier.

13. The storage medium of claim 12, wherein generating the leaf node involves generating a function for the activity-prediction model, wherein the function has the form:

$$p = \mathrm{logit}(a + b_1 * x_1 + b_2 * x_2 + \ldots + b_n * x_n);$$

wherein p is a probability that the contextual information corresponds to a target activity, wherein a and $b_i$ correspond to curve-fitting parameters, and wherein $x_i$ corresponds to a context feature value.

14. The storage medium of claim 12, wherein a temporal decision model associated with a non-leaf node selects an outgoing branch toward a leaf node when a temporal feature satisfies a temporal classifier of the decision model, and wherein the temporal classifier includes at least one of:
a season of the year;
a month of the year;
a week of the year;
a day of the year;
a day of the month;
a holiday;
a day of the week;
a weekend;
a week day;
a period of the day;
a time of day;
an activity time;
a time range; and
an elapsed amount of time since the last occurrence of a target activity.

15. A computer system comprising:
a processor; and
a storage device coupled to the processor and storing instructions that when executed by a computer cause the computer to perform a method, the method comprising:
determining, by a computing device, one or more activity groups based on historical activities for a user;
extracting contextual features from contextual information associated with an activity group;
calculating, for each of a plurality of time instances, an activity probability that the user is performing an activity associated with the activity group based on an analysis of the contextual features;
identifying one or more temporal features of the activity group, based on the activity probability values for the plurality of time instances, which comprises:
selecting an activity feature variable;
determining a set of possible temporal features for the activity feature variable based on the activity probability values; and
in response to determining that the activity feature variable includes a non-linear set of possible temporal features:
partitioning the activity feature variable into two or more binary variables; and
mapping each of the two or more binary variables to one or more corresponding possible temporal features; and
generating a decision tree, wherein a path of the decision tree includes a temporal decision model for each of the temporal features, wherein a temporal decision model compares a target time against a temporal classifier, and wherein a leaf node of the decision tree includes an activity-prediction model based on the activity probability.

16. The computer system of claim 15, wherein identifying the one or more temporal features further comprises:
in response to determining that the activity feature variable includes a linear set of possible temporal features, mapping the activity feature variable to the set of possible temporal features.

17. The computer system of claim 15, wherein identifying the one or more temporal features includes at least one of:
determining a timestamp for a historical activity of the activity group;
determining an average time duration for the historical activities in the activity group;
determining an activity frequency for the historical activities in the activity group; and
determining a time range associated with the activity group.

18. The computer system of claim 15, wherein an activity group includes a plurality of historical activities associated with a common geographic location.

19. The computer system of claim 15, wherein generating the decision tree further comprises:

generating a leaf node for the activity group, wherein the leaf node includes an activity-prediction model that is trained based on the contextual features;

in response to identifying the temporal features, adding a path to a leaf node in the decision tree based on the temporal features, wherein the added path includes a temporal decision model for each of the temporal features;

in response to determining that a temporal feature of the activity group is not covered by the added path, appending to the added path a sub-path that includes a temporal decision model for the temporal feature not covered by the added path; and wherein the method further comprises selecting a path of the decision tree from a root node to a leaf node of the decision tree based on the target time, wherein the selected path traverses two or more non-leaf nodes that are each associated with a temporal decision model that compares the target time against a temporal classifier.

20. The computer system of claim 19, wherein generating the leaf node involves generating a function for the activity-prediction model, wherein the function has the form:

$$p=\text{logit}(a+b_1*x_1+b_2*x_2+\ldots+b_n*x_n);$$

wherein p is a probability that the contextual information corresponds to a target activity, wherein a and $b_i$ correspond to curve-fitting parameters, and wherein $x_i$ corresponds to a context feature value.

21. The computer system of claim 19, wherein a temporal decision model associated with a non-leaf node selects an outgoing branch toward a leaf node when a temporal feature satisfies a temporal classifier of the decision model, and wherein the temporal classifier includes at least one of:
a season of the year;
a month of the year;
a week of the year;
a day of the year;
a day of the month;
a holiday;
a day of the week;
a weekend;
a week day;
a period of the day;
a time of day;
an activity time;
a time range; and
an elapsed amount of time since the last occurrence of a target activity.

* * * * *